(12) United States Patent
Kestly

(10) Patent No.: US 6,951,338 B2
(45) Date of Patent: Oct. 4, 2005

(54) CYLINDER HEAD GASKET

(75) Inventor: Michael J. Kestly, Bolingbrook, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/394,823

(22) Filed: Mar. 21, 2003

(65) Prior Publication Data

US 2004/0183260 A1 Sep. 23, 2004

(51) Int. Cl.⁷ .............................................. F02F 11/00
(52) U.S. Cl. ........................ 277/593; 277/594; 277/595
(58) Field of Search ........................ 277/592, 593–595, 277/598

(56) References Cited

U.S. PATENT DOCUMENTS

| | | | |
|---|---|---|---|
| 4,331,336 A | | 5/1982 | Czernik et al. |
| 5,286,039 A | * | 2/1994 | Kawaguchi et al. ........ 277/593 |
| 5,294,135 A | | 3/1994 | Kubouchi et al. |
| 5,310,196 A | | 5/1994 | Kawaguchi et al. |
| 5,348,315 A | | 9/1994 | Kawaguchi et al. |
| 5,472,217 A | | 12/1995 | Hagiwara et al. |
| 5,522,604 A | * | 6/1996 | Weiss et al. ................. 277/594 |
| 5,582,415 A | | 12/1996 | Yoshida et al. |
| 5,713,580 A | * | 2/1998 | Ueta ........................... 277/593 |
| 5,727,795 A | * | 3/1998 | Plunkett ..................... 277/601 |
| 5,803,462 A | | 9/1998 | Kozerski |
| 5,875,548 A | * | 3/1999 | Diez et al. ................. 29/888.3 |
| 5,879,011 A | | 3/1999 | Takata et al. |
| 5,951,021 A | | 9/1999 | Ueta |
| 6,056,296 A | | 5/2000 | Ii |
| 6,135,459 A | | 10/2000 | Hiramatsu et al. |
| 6,210,500 B1 | | 4/2001 | Zurfluh |
| 6,250,645 B1 | * | 6/2001 | Udagawa ..................... 277/595 |
| 6,315,303 B1 | | 11/2001 | Erb et al. |
| 6,343,795 B1 | | 2/2002 | Zerfass et al. |
| 6,347,801 B1 | | 2/2002 | Nakamura |
| 6,357,758 B1 | | 3/2002 | Zurfluh |
| 6,450,504 B2 | * | 9/2002 | Bleidt et al. ................. 277/592 |
| 2003/0062691 A1 | * | 4/2003 | Diez et al. ................... 277/590 |

\* cited by examiner

Primary Examiner—Heather Shackelford
Assistant Examiner—Vishal Patel
(74) Attorney, Agent, or Firm—Rader, Fishman & Grauer, PLLC

(57) ABSTRACT

A multi-layered cylinder head gasket for positioning between a cylinder head and a cylinder block of an engine includes a spacer layer and a stopper layer. The stopper layer includes either a wave or rigid stopper positioned at a periphery of an aperture of the stopper layer. A sealing bead is positioned adjacent the stopper. Overall, the stopper layer has a generally uniform thickness. The spacer layer, however, has first and second thicknesses with the second thickness being generally less than the first thickness. The second thickness of the spacer layer mates with the stopper and sealing bead when the stopper layer and spacer layer are joined together. A transition area is positioned between the first and second thicknesses. The variable thickness of the spacer layer permits the gasket to provide generally equal sealing stresses while subjected to variable compression forces.

12 Claims, 8 Drawing Sheets

CYLINDER HEAD GASKET

TECHNICAL FIELD

The present invention relates to a multi-layered cylinder head gasket and in particular to a gasket having a stopper layer of generally uniform thickness that cooperates with a spacer layer of various thickness.

BACKGROUND OF THE INVENTION

In the field of multi-layer steel cylinder head gaskets, the gaskets are generally formed of a plurality of sheet metal plates. A typical problem associated with these multi-layered steel gaskets is that, when assembled, a cylinder head and cylinder block tend to warp under the forces of the screws joining the head and block together. Accordingly, the sealing stress between the cylinder head and cylinder block must be greater surrounding the combustion chamber opening than in the area surrounding the cylinder head screws. Gaskets often contain sealing beads and stoppers in the edges of the sheet metal plates of the gasket around the combustion chamber holes, to focus the sealing stress on the combustion seal and provide elasticity.

Another challenge that is experienced in the field of cylinder head gaskets is that the gap to be sealed between the cylinder head and the cylinder block oscillates because of fast pressure and temperature changes in the engine. Therefore, the gasket is subjected to constantly changing compression forces, particularly in the area of the combustion chamber holes. The changing compression forces reduce the durability of the sealing beads and stoppers arranged around the holes because unequal sealing stresses result. The unequal sealing stresses also produce a poor quality seal between the cylinder head and cylinder block thereby permitting leaks and contamination of cylinder openings.

SUMMARY OF THE INVENTION

The present invention is directed to a gasket that produces substantially equal sealing stresses about cylinder apertures using at least a stopper layer having a generally uniform thickness and a variable thickness spacer layer.

Specifically, the invention is directed to a gasket comprising at least one stopper layer that employs a stopper and a sealing bead. Joined to the stopper layer is at least one spacer layer. The spacer layer has both a first thickness and a second thickness. The second thickness of the spacer layer is generally less than the first thickness to evenly distribute the sealing stress about the cylinder apertures.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
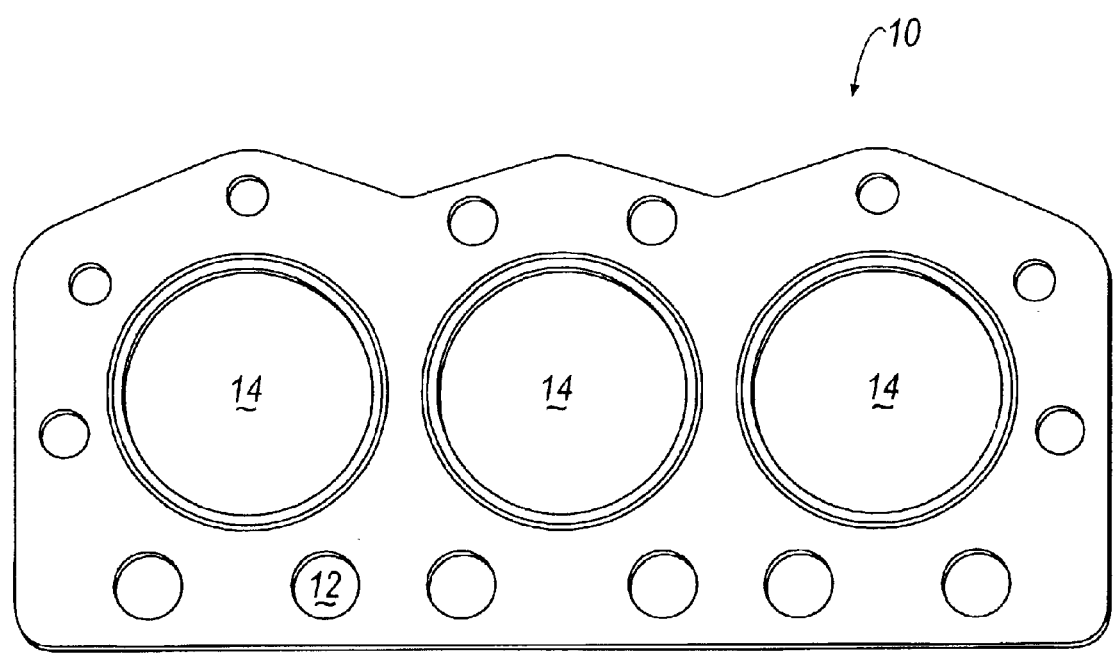
FIG. 1 is a top view of a cylinder head gasket of the present invention.

As seen in FIG. 1, a gasket of the present invention is generally referred to at 10. The gasket 10 includes a plurality of apertures such as bolt holes 12 and combustion openings 14 that mate with corresponding apertures of a cylinder head (not shown) and cylinder block (not shown). When fully assembled, the gasket 10 is positioned between the cylinder head and cylinder block to fill gaps and seal around various holes 12 and openings 14. The seal generated by gasket 10 serves to prevent leaks and contamination.

However, warpage of the cylinder head and cylinder block are created when a fastener (not shown) is tightened to mate the cylinder head and cylinder block. As described above, these warpage's result in unequal sealing stresses around the bolt holes 12 and combustion openings 14. Furthermore, rapid temperature and pressure changes within the engine cause the cylinder head and block to oscillate, thereby further varying sealing stress between the head and the block. Accordingly, gaskets generally produce an uneven seal about the holes 12 and openings 14. The present invention will herein be described with attention to the sealing stresses generated about the combustion openings 14. However, gasket 10 of the present invention may incorporate the described features about any aperture.

In accordance with the present invention, the gasket 10 is a multi-layered gasket 10 having at least one stopper layer 16 joined to at least one spacer layer 18 by techniques commonly used by one skilled in the art, such as adhesives or welding. Various embodiments of the multi-layered gasket 10 are shown throughout FIGS. 2–7 and similar reference numerals are used throughout FIGS. 1–8. Generally, each embodiment shows one spacer layer 18 along with at least one stopper layer 16. The gasket 10 may also include one or more bead layer 17. Each layer 16, 17, 18 of gasket 10 is generally manufactured of stainless steel or aluminum. In the case of engines using cylinder heads or blocks made from magnesium, the layers 16, 17, or 18 in contact with the magnesium cylinder head or block would be made from aluminum or an aluminum clad steel material. Other materials suitable for contact with magnesium are also contemplated. The use of stainless steel for layers 16, 17, 18 in contact with the magnesium head or block is generally not preferred due to the potential for severe galvanic corrosion. When engines are manufactured with cast iron or aluminum cylinder heads and cylinder blocks, the layers 16, 17, 18 are generally-made of stainless steel. Stainless steel provides good resilient properties and permits simple manufacture of the gasket 10. Although, stainless steel is preferred, any material compatible with the cylinder head and cylinder block is contemplated by the present invention.

Referring specifically to the stopper layer 16 shown throughout FIGS. 2–7, stopper layer 16 includes a stopper generally shown at 22. Additionally, the stopper layer 16 may also include a sealing bead 20. The bead 20 and stopper 22 are incorporated to fill the gaps between the cylinder head and cylinder block. FIGS. 2–6 illustrate the presence of one sealing bead 20 and one stopper 22 incorporated within the stopper layer 18. Alternatively, as shown in FIG. 7, the bead layers 17 includes only the sealing bead 20, while the stopper layer 16 includes only the stopper 22. Other alternative arrangements of combination of sealing beads 20 and stoppers 22 are also contemplated by the present invention. Furthermore, the embodiments illustrated in the figures show the use of two or three bead layers 17 in combination with one stopper layer 16 and one spacer layer 18. However, any quantity of layers 16, 17, 18 is acceptable based upon the sealing requirements of the engine. At a minimum, only one spacer layer 18 in combination with one stopper layer 16 having one stopper 22 is necessary.

The stopper 22 incorporated into stopper layer 16 may be either a wave stopper 22a or a rigid stopper 22b. A wave stopper 22a, as shown in FIGS. 2–6, includes a plurality of small embossments 24. A rigid stopper 22b, as best seen in FIG. 7, includes a portion of folded-back metal to create a thickened portion wherein the height of the rigid stopper 22b is substantially uniform. Various stopper 22 constructions, such as welded shim, are also contemplated by the present invention. The stopper 22 is generally positioned at a periphery of the stopper layer 16 about an aperture such as combustion opening 14. This position permits the stopper 22 to fill gaps between the cylinder head and cylinder block to provide equal sealing stress and a quality seal that prevents leaks and contamination.

The sealing beads 20 of the stopper layer 16 or bead layer 17 are generally a projection in the relatively flat surface of the layers 16, 17. The beads 20 may extend linearly outward from the relatively flat surface of the layers 16, 17 in either direction. The particular direction is determined from the sealing expectations of gasket 10 for a particular engine configuration. Sealing beads 20 are generally positioned adjacent to stopper 22 and away from the periphery of the gasket 10 about the combustion opening 14. The sealing beads 20 function as springs. Additionally, the sealing beads 20 function optimally by receiving an optimal load and having improved durability when compression of the beads 20 is limited to about 0.05 mm. Additional compression requires the presence of additional sealing beads 20. The optimal compression of about 0.05 mm is an example and is not intended to limit the scope of the invention.

In accordance with the present invention, the stopper layer 16 has a generally uniform thickness. The thickness of the stopper layer 16 does vary slightly at the periphery of the gasket 10 about combustion opening 14 with the incorporation of the stopper 22. The stopper 22 is included in the stopper layer 16 to fill the gap between the cylinder head and cylinder block. Accordingly, the stopper layer 16 is minimally thicker at the periphery about the combustion opening 14. However, overall, the stopper layer 16 is of a generally uniform thickness throughout the relatively flat surface of the stopper layer 16 and also in embodiments of the present invention that incorporate the sealing bead 20 in the stopper layer 16. The generally uniform thickness helps minimize the effects of unequal compression forces to produce equal sealing stresses and a better seal by gasket 10.

Referring specifically to the spacer layers 18 shown in FIGS. 2–7, the spacer layers 18 include a first thickness T1 and a second thickness T2. The second thickness T2 is generally less than the first thickness T1. The portion of the spacer layer 18 incorporating the second thickness T2 preferably mates with at least the portion of the stopper layer 16 incorporating the stopper 22. Additionally, the portion of the spacer layer 18 having the second thickness T2 may also mate with the sealing bead 20 of the stopper layer 16 or the bead layer 17. The reduced second thickness T2 of the spacer layer 18 is utilized in areas of gasket 10 that are subject to lower compression forces. Areas of the gasket 10 subject to high compression forces incorporate the portion of the spacer layer 18 with the greater first thickness T1. Areas of the reduced second thickness T2 in combination with the greater first thickness T1 areas balance the sealing stresses generated by the gasket 10. This results in a more effective seal to prevent leaks and contamination. As an example, best shown in FIG. 8, the gasket 10 may alternate areas having the first thickness T1 and second thickness T2 in the spacer layer 18 about the combustion opening 14. Furthermore, a transition area 26 is preferably positioned between the areas of the first thickness T1 and the second thickness T2. The transition area 26 provides a smooth adjustment between the two thicknesses T1, T2. Incorporating the transition area 26 improves the effectiveness of the gasket 10 by further equalizing the sealing stresses about the combustion opening 14.

FIGS. 2–7 illustrate various embodiments of the present invention. Specifically, FIGS. 2A–2B illustrate a first embodiment of gasket 10 of the present invention. The first embodiment includes a bead layer 17 having one sealing bead 20. Adjacent the bead layer 17 is a stopper layer 16 having one sealing bead 20 and one wave stopper 22a.

Figure 2A:
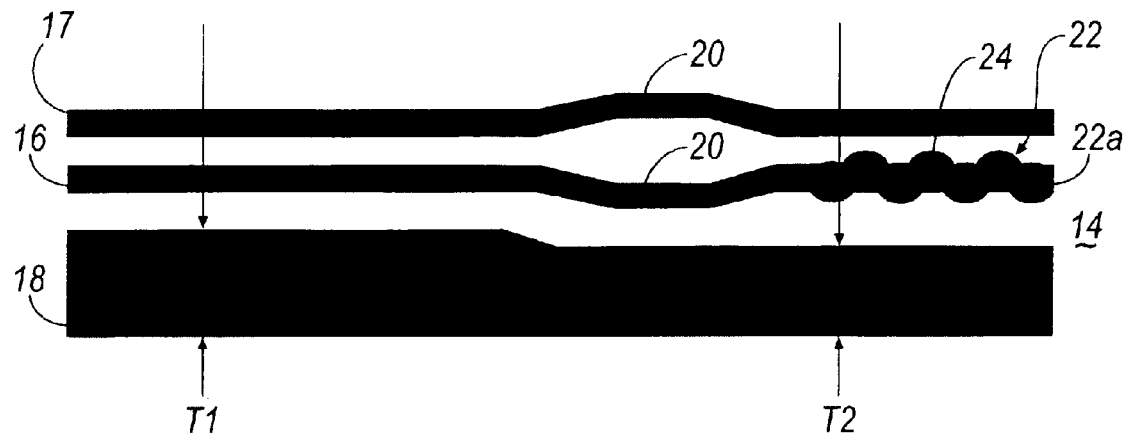
FIG. 2A is a cross-sectional view of a first embodiment of the present invention at a portion of the gasket subject to low compression forces.
Figure 2B:
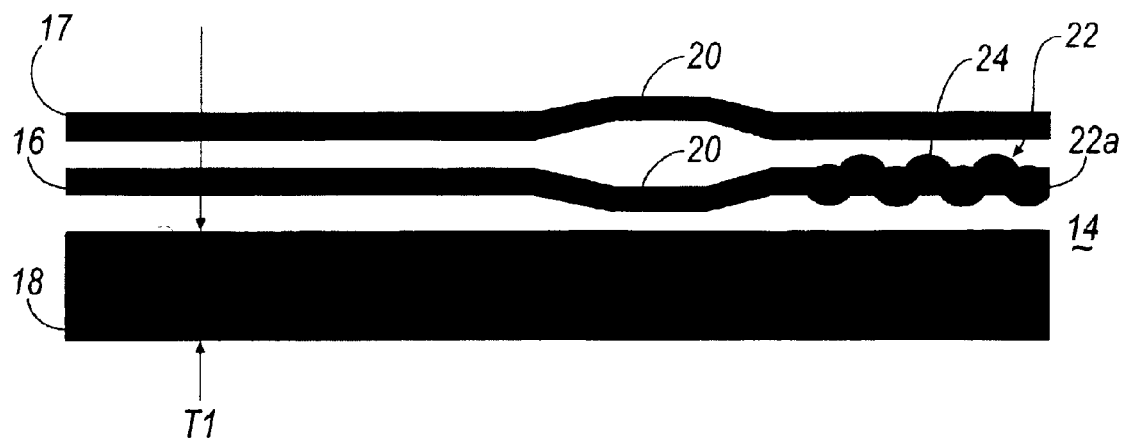
FIG. 2B is a cross-sectional view of the first embodiment at a portion of the gasket subject to high compression forces.

Adjacent the stopper layer 16 is spacer layer 18. FIG. 2A shows a portion of the gasket 10 that is subject to lower compression forces. Accordingly, the spacer layer 18 includes a reduced second thickness T2 that cooperates with the sealing bead 20 and wave stopper 22a of the stopper layer 16. FIG. 2B shows a portion of the first embodiment of gasket 10 subject to higher compression forces and the spacer layer 18 has a uniform first thickness T1.

Figure 3A:
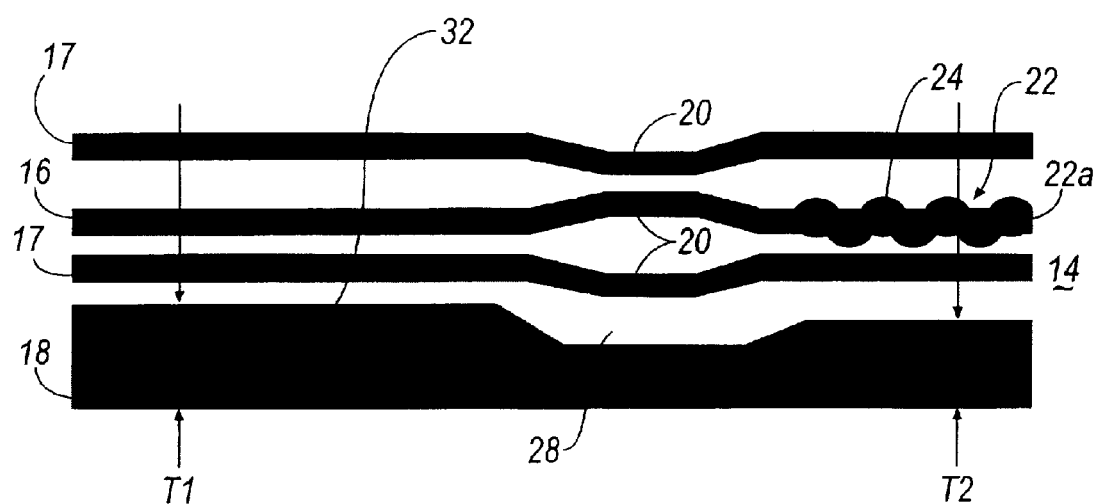
FIG. 3A is a cross-sectional view of a second embodiment of the present invention at a portion of the gasket subject to low compression forces.
Figure 3B:
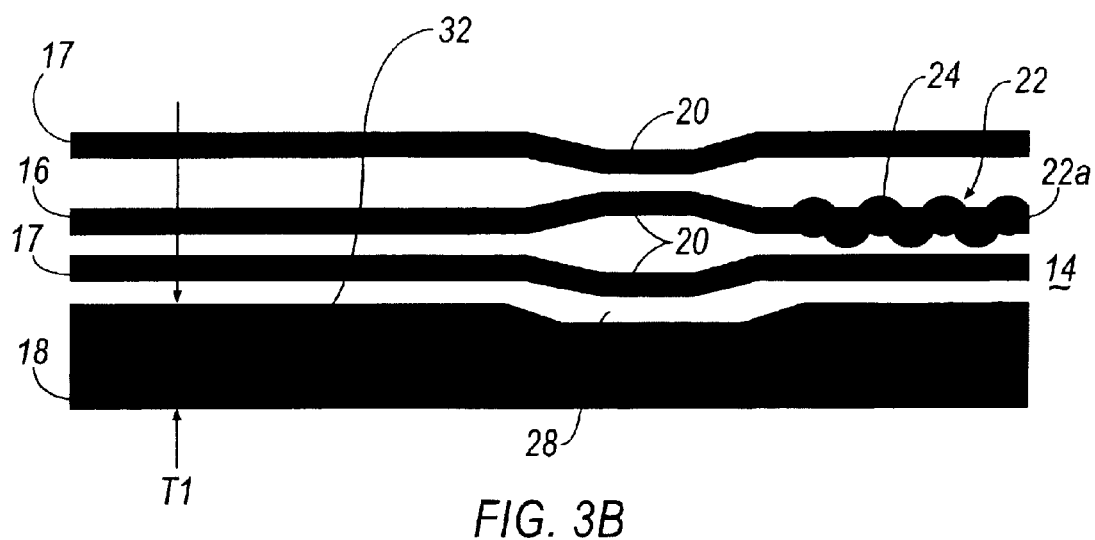
FIG. 3B is a cross-sectional view of the second embodiment at a portion of the gasket subject to high compression forces.

FIGS. 3A–3B illustrate a second embodiment of the gasket 10 of the present invention. The second embodiment includes two bead layers 17 each having one sealing bead 20. Sandwiched between the two bead layers 16a is a stopper layer 16 with one sealing bead 20 and one wave stopper 22a. Positioned adjacent one of the bead layers 17 is the spacer layer 18. Spacer layer 18 includes a recess 28 that mates with the sealing bead 20 of bead layer 17. The recess 28 is a reduction in thickness of the spacer layer 18. The inclusion of a recess 28 depends upon engine configurations and sealing requirements about the combustion opening 14. In the second embodiment the recess 28 is positioned in an upper surface 32 of the spacer layer 18. FIG. 3A shows a portion of the second embodiment subject to lower compression forces. Accordingly, the spacer layer 18 includes a reduced second thickness T2 that corresponds with the sealing bead 20 and wave stopper 22a of the stopper layer 16. FIG. 3B shows a portion of the second embodiment subject to higher compression forces and the spacer layer 18 has a generally uniform first thickness T1 with the exception of the recess 28.

Figure 4A:
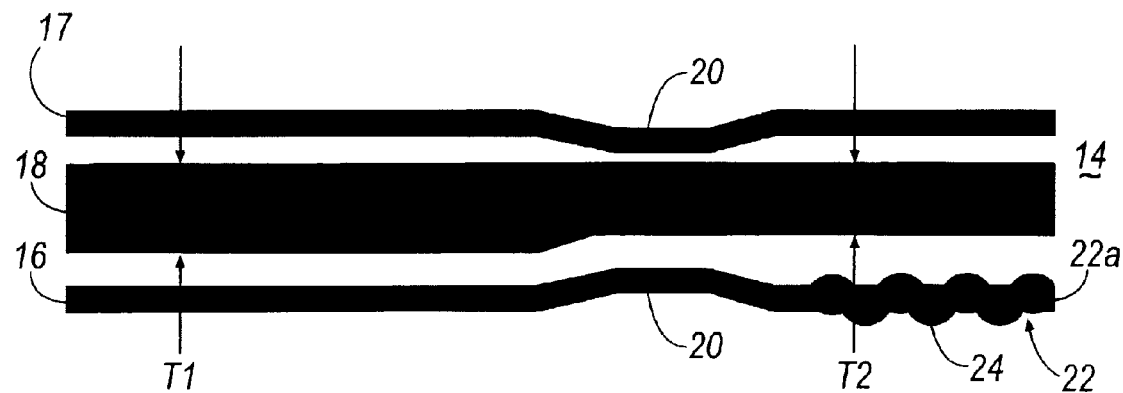
FIG. 4A is a cross-sectional view of a third embodiment of the present invention at a portion of the gasket subject to low compression forces.
Figure 4B:
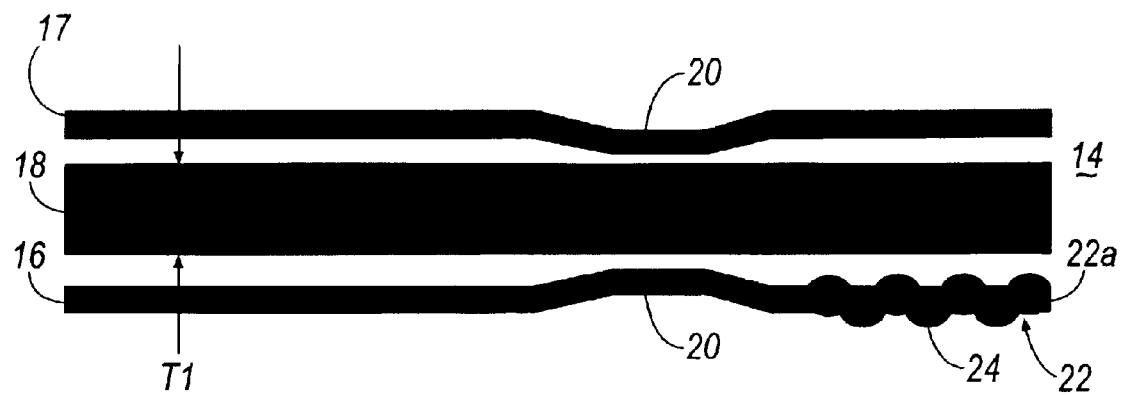
FIG. 4B is a cross-sectional view of the third embodiment at a portion of the gasket subject to high compression forces.

FIGS. 4A–4B illustrate a third embodiment of the gasket 10 of the present invention. The third embodiment includes one bead layer 17 with one sealing bead 20 and one stopper layer 16 with both a sealing bead 20 and a wave stopper 22a. The spacer layer 18 is positioned between each of these layers 16, 17. FIG. 4A shows a portion of the third embodiment of the gasket 10 subject to lower compression forces. Accordingly, the spacer layer 18 includes a reduced second thickness T2 that mates with both the sealing bead 20 and the wave stopper 22a of the stopper layer 16. FIG. 4B shows a portion of the third embodiment subject to higher compression forces and the spacer layer 18 has a generally uniform first thickness T1.

Figure 5A:
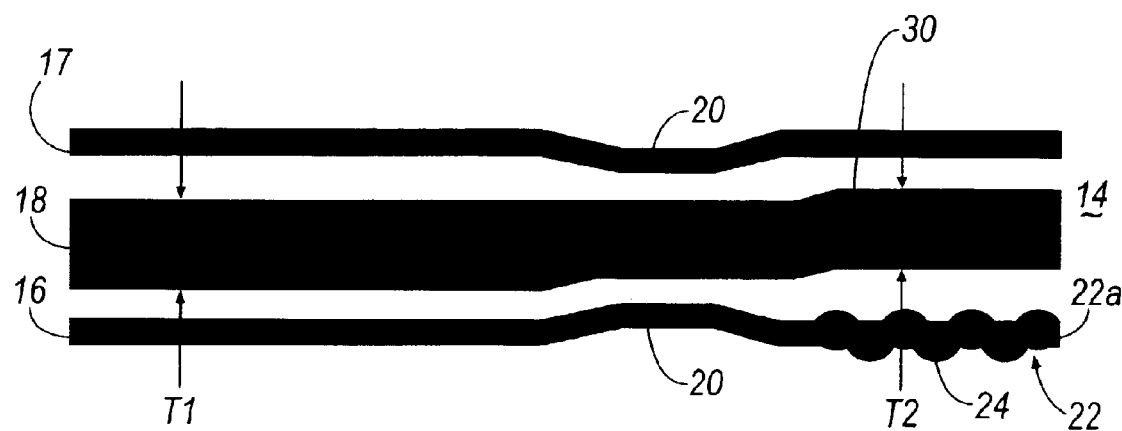
FIG. 5A is a cross-sectional view of a fourth embodiment of the present invention at a portion of the gasket subject to low compression forces.
Figure 5B:
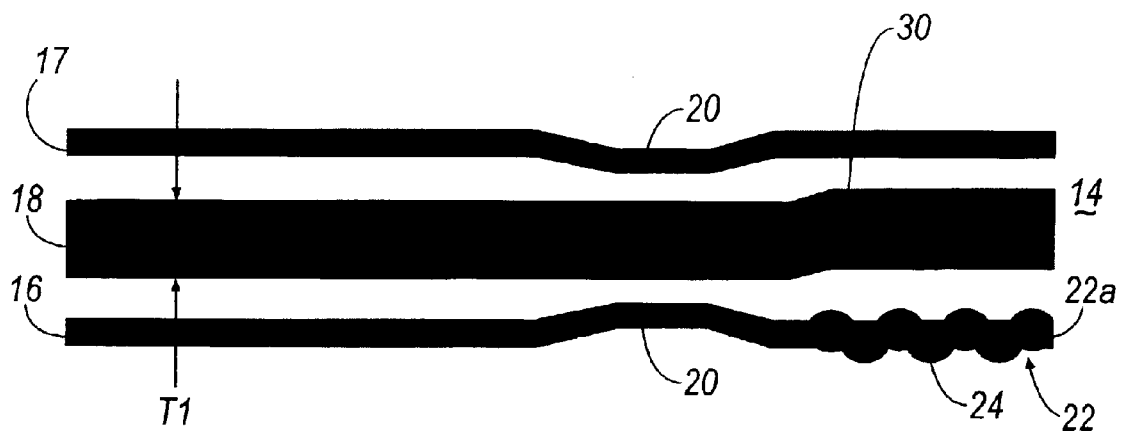
FIG. 5B is a cross-sectional view of the fourth embodiment at a portion of the gasket subject to high compression forces.

FIGS. 5A–5B illustrate a fourth embodiment of the gasket 10 of the present invention. The fourth embodiment includes one bead layer 17 with one sealing bead 20 and one stopper layer 16 with both one sealing bead 20 and one wave stopper 22a. The spacer layer 18 is positioned between each of these layers 16, 17. The spacer layer 18 further includes a deviation 30 from its relatively flat arrangement. The deviation 30 is positioned adjacent to the portion of the spacer layer 18 that mates with the wave stopper 22a. The inclusion of a deviation 30 depends upon engine configuration and sealing requirements about combustion opening 14. The deviation 30 is only an adjustment to the relatively flat surface of the spacer layer 18. The spacer layer 18 retains its generally uniform thickness even at the portion of the spacer layer 18 including the deviation 30. FIG. 5A shows a portion of the fourth embodiment of the gasket 10 subject to lower compression forces. Accordingly, the spacer layer 18 includes a reduced second thickness T2 that mates with both the sealing bead 20 and wave stopper 22a of the stopper layer 16. FIG. 5B shows a portion of the fourth embodiment of the gasket 10 that is subject to higher compression forces and has a generally uniform first thickness T1.

Figure 6A:
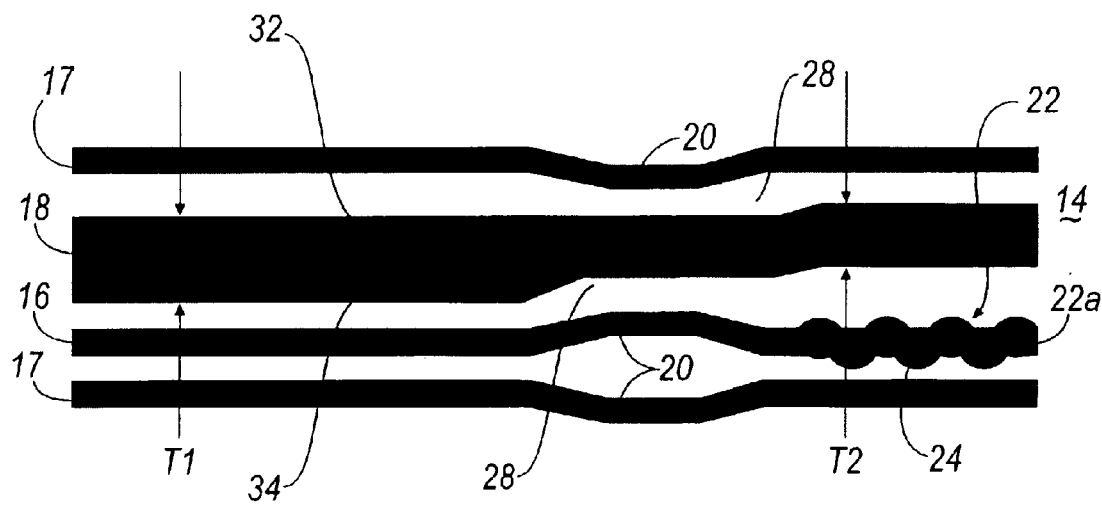
FIG. 6A is a cross-sectional view of a fifth embodiment of the present invention at a portion of the gasket subject to low compression forces.
Figure 6B:
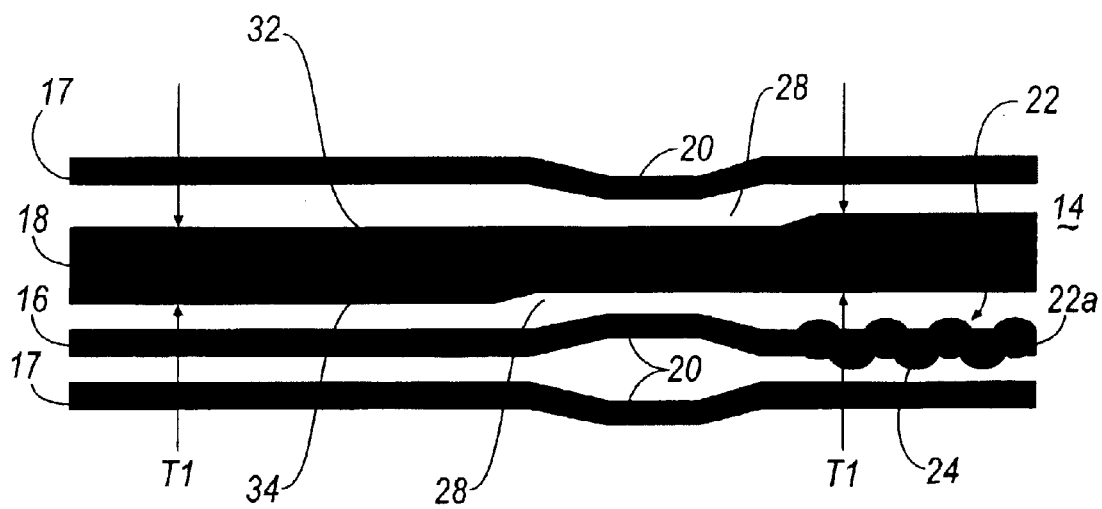
FIG. 6B is a cross-sectional view of the fifth embodiment at a portion of the gasket subject to high compression forces.

FIGS. 6A–6B illustrate a fifth embodiment of the gasket 10 of the present invention. The fifth embodiment includes two bead layers 17 each including one sealing bead 20. The fifth embodiment also includes one stopper layer 16 having both one sealing bead 20 and one wave stopper 22a. The stopper layer 16 and spacer layer 18 are joined and positioned between the two bead layers 17. The spacer layer 18 includes a plurality of recesses 28 that mate with the sealing beads 20 of the stopper layer 16 and bead layer 17. In the fifth embodiment the recesses 28 are positioned in both an upper surface 32 and a lower surface 34 of the spacer layer 18. FIG. 6A shows a portion of the fifth embodiment of the gasket 10 that is subject to lower compression forces. Accordingly, the spacer layer 18 includes a reduced second thickness T2 that mates with both the sealing bead 20 and the wave stopper 22a of the stopper layer 16. FIG. 6B shows a portion of the fifth embodiment of the gasket 10 that is subject to higher compression forces and has a generally uniform thickness T1 with the exception of recesses 28.

Figure 7A:
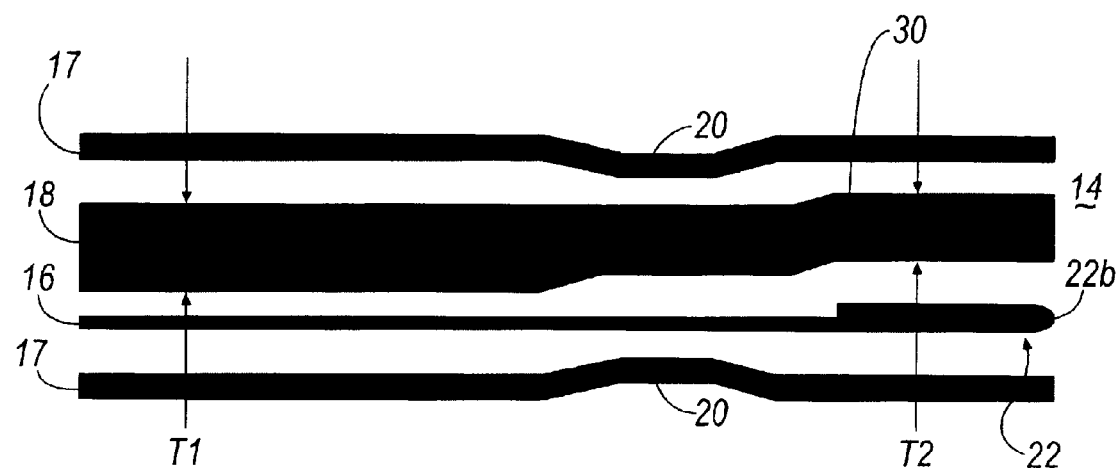
FIG. 7A is a cross-sectional view of a sixth embodiment of the present invention at a portion of the gasket subject to low compression forces.
Figure 7B:
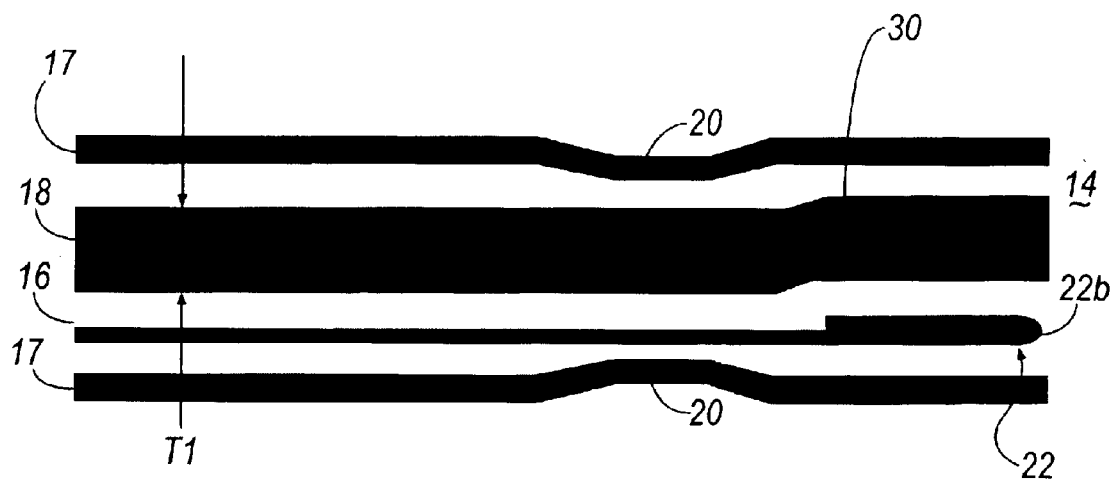
FIG. 7B is a cross-sectional view of the sixth embodiment at a portion of the gasket subject to high compression forces.
Figure 8:
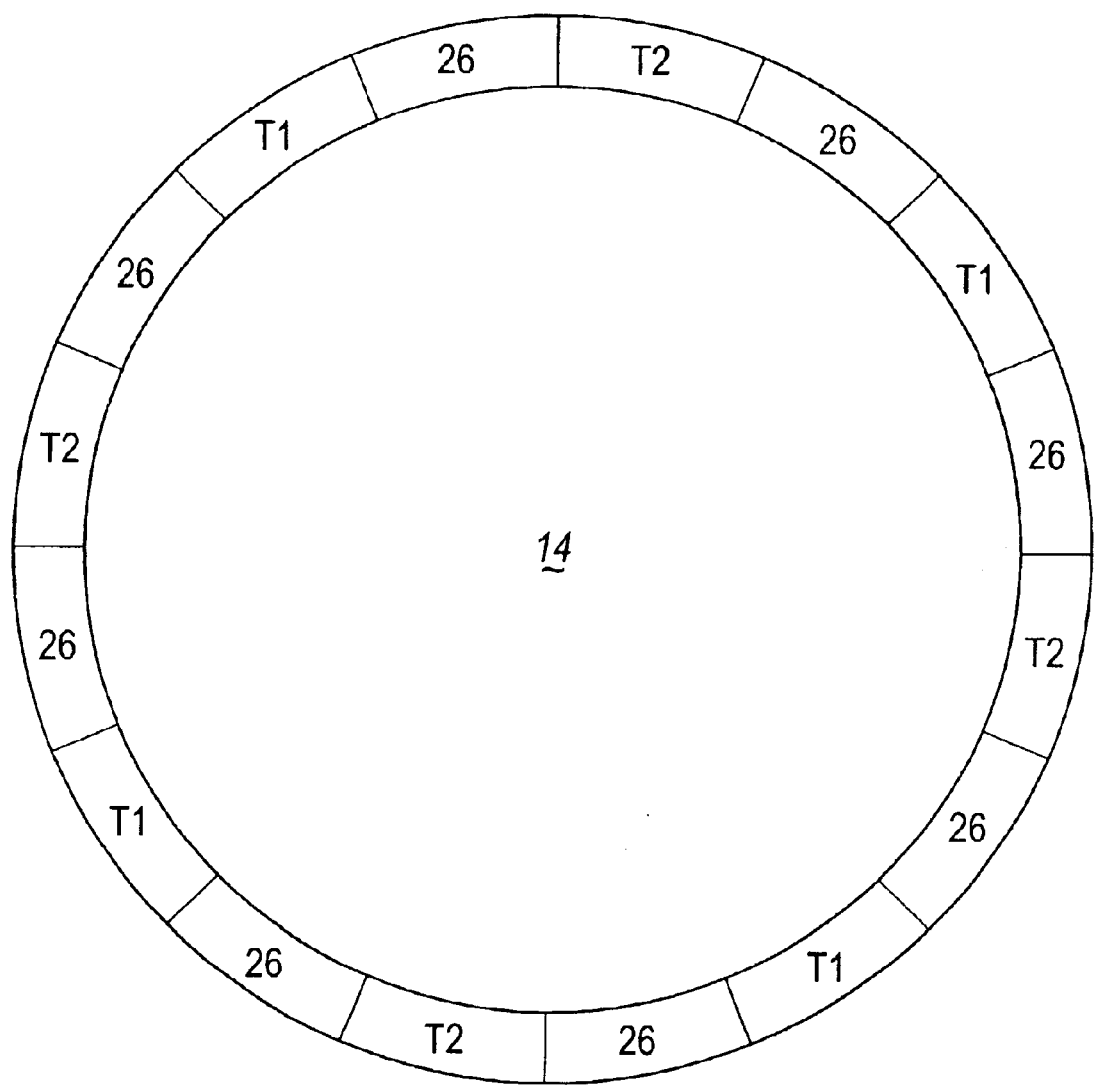
FIG. 8 is a top view of a portion of the gasket around an aperture of the present invention illustrating the alternating arrangement of a first thickness, second thickness and transition area of a spacer layer about the aperture.

Finally, FIGS. 7A–7B illustrate a sixth embodiment of the gasket 10 of the present invention. The sixth embodiment includes two bead layers 17 each having one sealing bead 20. The sixth embodiment also includes one stopper layer 16 having only a rigid stopper 22b. The stopper layer 16 is joined to spacer layer 18 and the layers 16, 18 are positioned between each of the bead layers 16. The spacer layer 18 further includes a deviation 30 from its relatively flat arrangement. The deviation 30 is positioned at the portion of the spacer layer 18 that mates with the rigid stopper 22b. FIG. 7A shows a portion of the sixth embodiment of the gasket 10 subject to lower compression forces. Accordingly, the spacer layer 18 includes a reduced second thickness T2 that mates with both the sealing bead 20 and rigid stopper 22b of the stopper layer 16. FIG. 7B shows a portion of the sixth embodiment of the gasket 10 that is subject to higher compression forces and has a generally uniform first thickness T1 along with deviation 30.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A gasket comprising:
   at least one stopper layer having a stopper and a separate sealing bead proximate said stopper, said stopper layer including an aperture;
   at least one spacer layer joined to said at least one stopper layer including an aperture that corresponds with said aperture of said stopper layer;
   said spacer layer having a first thickness and a second thickness wherein said second thickness is generally less than said first thickness; and
   whereby said at least one spacer layer further includes a recess that mates with said sealing bead of said at least one stopper layer, wherein said recess is defined as a reduction in thickness in said at least one spacer layer.

2. A gasket, as in claim 1, wherein said sealing bead is positioned adjacent said stopper and spaced away from a periphery of said aperture of said at least one stopper layer.

3. A gasket, as in claim 1, wherein said second thickness of said at least one spacer layer mates with said sealing bead and said stopper of said at least one stopper layer.

4. A gasket comprising:
- at least one stopper layer having a stopper including an aperture;
- at least one spacer layer joined to said at least one stopper layer and also including an aperture that corresponds with said aperture of said stopper layer;
- said spacer layer having a first thickness and a second thickness wherein said second thickness is generally less than said first thickness; and
- wherein said at least one spacer layer further includes a recess that mates with a sealing bead of said at least one stopper layer, wherein said recess is defined as a reduction in thickness in said at least one spacer layer.

5. A gasket, as in claim 4, wherein said at least one spacer layer further includes a recess that mates with said sealing bead of said at least one bead layer, wherein said recess is defined as a reduction in thickness in said at least one spacer layer.

6. A gasket, as in claim 4, further including at least one least one sealing bead.

7. A gasket, as in claim 4, wherein said at least one stopper layer has a generally uniform thickness.

8. A gasket, as in claim 4, wherein said stopper is positioned at a periphery of said aperture of said at least one stopper layer.

9. A gasket, as in claim 4, wherein said second thickness of said at least one spacer layer is positioned at a periphery of said aperture of said at least one spacer layer and mates with said stopper of said at least one stopper layer.

10. A gasket, as in claim 4, wherein said at least one spacer layer includes a transition area positioned between said first thickness and said second thickness.

11. A gasket, as in claim 4, wherein said stopper is a wave stopper having a plurality of embossments.

12. A gasket, as in claim 2, wherein said at least one spacer layer further includes a recess that mates with said sealing bead of said at least one bead layer, wherein said recess is defined as a reduction in thickness in said at least one spacer layer.

* * * * *